(12) United States Patent
Gilmour et al.

(10) Patent No.: US 7,590,718 B2
(45) Date of Patent: Sep. 15, 2009

(54) FABRIC NETWORK MANAGEMENT AND DIAGNOSTIC TOOL

(75) Inventors: David Alexander Gilmour, Almonte (CA); Harvey Parisien, Ottawa (CA)

(73) Assignee: Fabric Embedded Tools Corporation, Kanta (CA)

( * ) Notice: Subject to any disclaimer, the term of this patent is extended or adjusted under 35 U.S.C. 154(b) by 767 days.

(21) Appl. No.: 11/188,928

(22) Filed: Jul. 26, 2005

(65) Prior Publication Data

US 2006/0026275 A1 Feb. 2, 2006

Related U.S. Application Data

(60) Provisional application No. 60/591,081, filed on Jul. 27, 2004.

(51) Int. Cl.
*G06F 15/173* (2006.01)

(52) U.S. Cl. .................................. 709/223; 709/238

(58) Field of Classification Search .......... 709/223–238
See application file for complete search history.

(56) References Cited

U.S. PATENT DOCUMENTS 7,143,153 B1 * 11/2006 Black et al. ................. 709/223
7,222,147 B1 * 5/2007 Black et al. ................. 709/200
2002/0159437 A1 * 10/2002 Foster et al. ................ 370/351
2002/0165961 A1 * 11/2002 Everdell et al. ............ 709/225
2003/0035005 A1 * 2/2003 Kodosky et al. ........... 345/763
2003/0120822 A1 * 6/2003 Langrind et al. ........... 709/251
2003/0228146 A1 * 12/2003 Fortin et al. .................. 398/45
2004/0030763 A1 * 2/2004 Manter et al. .............. 709/223
2004/0031030 A1 * 2/2004 Kidder et al. ............... 717/172
2004/0078467 A1 * 4/2004 Grosner et al. ............. 709/226
2004/0139371 A1 * 7/2004 Wilson et al. ................. 714/43
2005/0083854 A1 * 4/2005 Nagarajrao et al. ......... 370/254
2005/0108444 A1 * 5/2005 Flauaus et al. ............... 710/15
2005/0198247 A1 * 9/2005 Perry et al. ................. 709/223

* cited by examiner

*Primary Examiner*—Phuoc Nguyen
(74) *Attorney, Agent, or Firm*—Teitelbaum & MacLean; Neil Teitelbaum; Doug MacLean

(57) ABSTRACT

The invention relates to a maintenance and diagnostic tool for embedded fabric (EF) networks providing an interactive graphical user interface for displaying, monitoring and managing processing elements, such as microprocessors, switches, bridges and memory, within the EF network. The computer software tool identifies the various processing elements in the system along with the data routes therebetween, gives each processing element a unique identification label, and then initializes each switch with routing tables. All of the aforementioned information is then used to construct an interactive graphical user interface of the network map illustrating the various processing elements and the active and inactive data paths extending therebetween.

26 Claims, 15 Drawing Sheets

RapidFET™
Routing Table Report

| | |
|---|---|
| Network Map File name: | Merc Demo5.rfm |
| Date: | 15 July, 2005 |

Routing Tables:

| | |
|---|---|
| Node: | 2 |
| Common Name: | Tundra Tsi500 |
| Device ID: | 0500h |
| Vendor ID: | 000Dh |
| # Ports: | 4 |
| Mode: | One per ingress port |
| Comment: | |

Ingress Port 0 Lookup table

| Dest ID (HEX) | Port # |
|---|---|
| No routes | |

Ingress Port 1 Lookup table

| Dest ID (HEX) | Port # |
|---|---|
| 9,A | 2 |
| 8 | 3 |

Ingress Port 2 Lookup table

| Dest ID (HEX) | Port # |
|---|---|
| 4,5,6 | 1 |
| B | 3 |

Figure 11c

RapidFET™
Watch Window Report

Network Map File name: 568-jp.rfm
Date: 15 July, 2005

Watch List

| # | DestID | Register | BF | Value | Trigger When | #Triggers | Action | Log | Update Period |
|---|--------|----------|-----|-------|--------------|-----------|--------|-----|---------------|
| T1 OFF | FFFFh | Component Tag CSR | Component Tag | 3CC01E01h | BF Changes | 0 | None | None | 5 Seconds |
| T2 OFF | FFFFh | Host Base Device ID Lock CSR | Host Base Device ID | FFFFh | BF Changes | 0 | None | None | 5 Seconds |
| T3 OFF | FFFFh | Route Config DestID CSR | Large Configuration Destination ID | 0 | BF Changes | 0 | None | None | 5 Seconds |
| T4 OFF | FFFFh | Route LUT Attributes CSR | Default Port | FFh | BF Changes | 0 | None | None | 5 Seconds |

Reported by RapidFET™                                          http://www.fetcorp.com/

Figure 11d

FABRIC NETWORK MANAGEMENT AND DIAGNOSTIC TOOL

CROSS-REFERENCE TO RELATED APPLICATIONS

The present invention claims priority from U.S. Patent Application No. 60/591,081 filed Jul. 27, 2004, which is incorporated herein by reference.

TECHNICAL FIELD

The present invention relates to a system for graphically illustrating, designing, managing and monitoring an embedded fabric-based system, and in particular to software providing a graphic user interface (GUI) for network management of a switched fabric based system.

BACKGROUND OF THE INVENTION

Currently, fabric-based systems, e.g. RapidIO (RIO), PCI Express (PCIe), and Advanced Switching Interconnect (ASI), require deep technical knowledge of the protocol and software to be able to initiate and extract information therefrom. RIO, PCIe and ASI architectures are electronic data communications standards for interconnecting chips on a circuit board and circuit boards using a backplane. The RapidIO architecture, for example, is designed to be used for the processor and peripheral interface where bandwidth and low latency are crucial. RapidIO, like ASI, was designed for embedded systems, primarily for networking and communications equipment, enterprise storage, and other high-performance embedded markets. PCIe, while originally developed for the Server market, is now also finding applications within the embedded systems. In addition to technical requirements, the high-performance embedded market requires an open standard interconnect. Currently, the market suffers from an overabundance of proprietary buses, requiring standard product and ASIC-based bridges to connect the various devices in the system. The RapidIO interconnect provides a common connection architecture for general purpose RISC processors, digital signal processors, communications processors, network processors, memory controllers, peripheral devices, and bridges to legacy buses, which benefits users by reducing cost, time-to-market, and complexity.

Existing fabric-based technology tools provide a method of interrogation, i.e. discovering what is in the network, which utilizes a series of command line instructions, e.g. command>function_name parameter1, parameter2, parameter3. Alternatively, specific software could be written to perform the discovery algorithm, and provide a table of data, which would need to be manually deciphered to understand the system and what the system interconnections look like. Furthermore, simple functions, such as accessing specific properties of the devices must be executed through use of one or more command line functions, followed by an interpretation of a register hexadecimal number.

Checking the operation of processing elements, as well as the links therebetween, also necessitated the use of one or more command line functions, and the user's interpretation of a register value/number to understand if something is not functioning properly and to identify what that might be. The operation check is also complicated because different devices in a system may encode the information in different ways, so you would need to memorize codes or have reference manuals at the ready for each device.

In order for the registers in remote parts of the system to be monitored or edited one or more command line functions would have to be manually entered, including the data needed to tell the computer which node in the network you wish to interrogate and which register address you wish to read. Subsequently, the register contents/value would be provided, which would require the user to manually interpret the data to understand what the values mean. Similarly, system performance monitoring could only be executed through the use of one or more command line functions to obtain performance register values, which would have to be manually interpreted to understand what the values mean.

Visualizing data paths was not possible in conventional system; however, the information could be manually gathered through multiple command line functions, and the manual interpretation of the output to provide the user with data path information. Similarly, routing table data could only be obtained through the use of one or more command line functions, and the manual calculation of the appropriate hop counts and identifying destination IDs.

Network management software is common to LAN/WAN type networks, in which nodes are pieces of computer systems, e.g. Servers, routers, gateways; however, a fully interactive network management and diagnostic tool for processing elements, e.g. processors, memory, bridges and switches, has never existed in the embedded world. Conventional network management software provides a picture of an element in a network map; however, to interact with the element the machine address and the specific register addresses and offsets must be known and specified.

An object of the present invention is to overcome the shortcomings of the prior art by providing a user interface, which not only extracts the information relating to the elements of a fabric embedded network, but analyzes and graphically illustrates the information providing design, monitoring and management functionality. Another object of the present invention is to provide the user with a fully interactive network map, which enables the user to visually select any processing element from within the map, and, by using a variety of mouse/button initiated functions, force operations on the processing element to either read information, write information, or monitor information associated with that specific device. An interactive map enables the user to operate on what they see in the map, and derives machine addressing details in the background.

SUMMARY OF THE INVENTION

Accordingly, the present invention relates to a method of creating an interactive network map for management of an embedded fabric based system including a plurality of processing elements, which include at least one switch, comprising the steps of:

a) discovering processing elements in the system and data routes therebetween;

b) enumerating each processing element with a unique identification label;

c) initializing each switch with routing tables to ensure all processing elements are capable of communicating with each other; and d) producing a graphical user interface including an interactive network map with corresponding icons for each processing element and the data routes therebetween, whereby information about a specific processing element is displayed by activating the icon corresponding to the specific processing element.

BRIEF DESCRIPTION OF THE DRAWINGS

The invention will be described in greater detail with reference to the accompanying drawings which represent preferred embodiments thereof, wherein:

FIG. 11a to 11e illustrate various reports generated by the maintenance and diagnostic tool according to the present invention.

DETAILED DESCRIPTION

Figure 1:
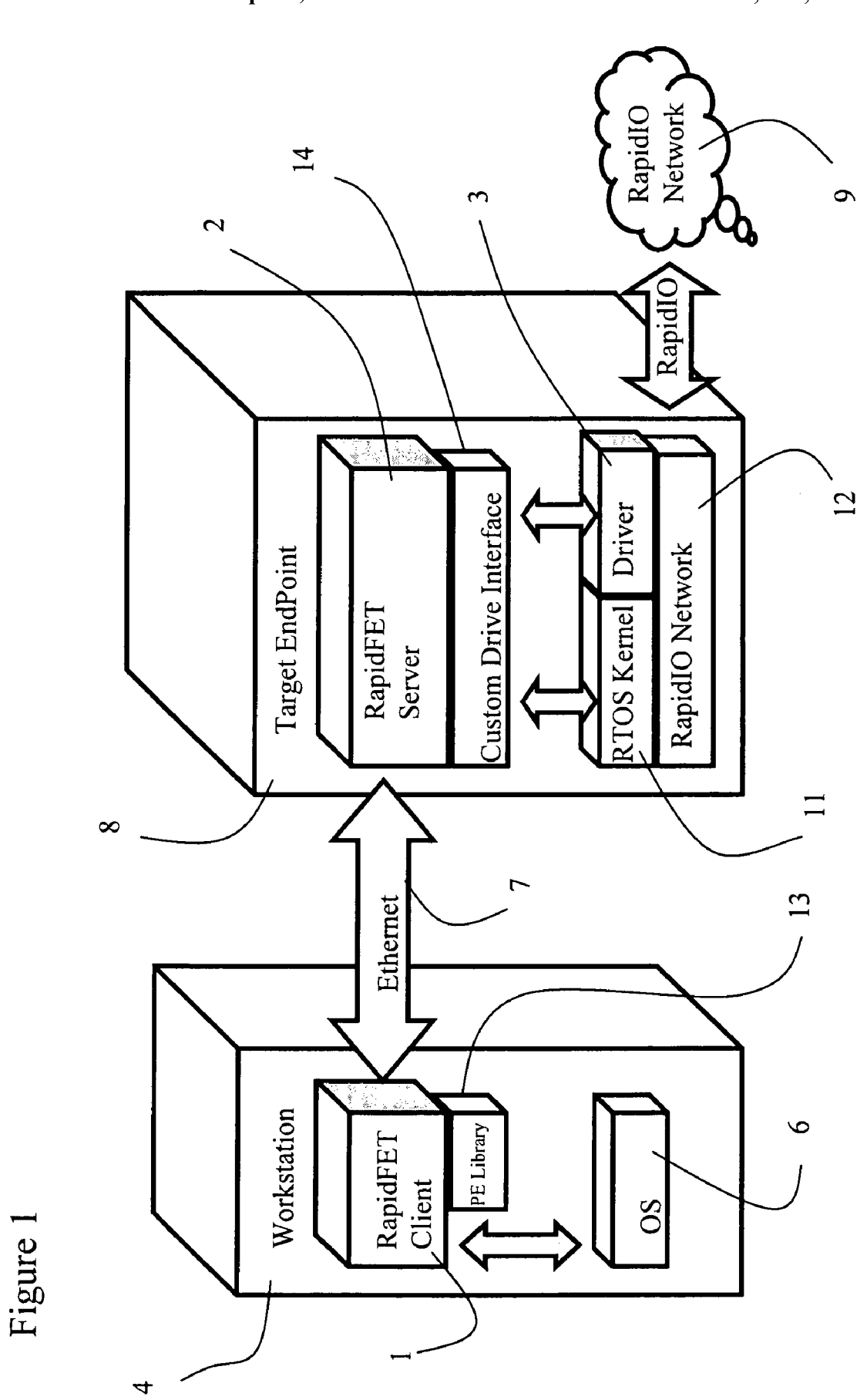
FIG. 1 illustrates a block diagram of how the software of the current invention accesses a fabric-embedded network, e.g. a RapidIO Network.

With reference to FIG. 1, the network management and diagnostic tool according to the present invention includes three components, a client application 1, a server application 2, and a driver application 3. The client application 1 is loaded onto a remote workstation 4 and supported by a conventional operating system 6, e.g. Window's XP. The client application 1 communicates with the server application 2 via a communication link 7, e.g. Ethernet TCP/IP, and provides a graphical user interface therefor. The server application 2 is software running on a target endpoint 8, i.e. a processing element, within a Real-Time Operating system (RTOS) 11, e.g. WindRiver's VxWorks, and implements a hardware abstraction layer (HAL) to enable basic operations to be performed on the embedded fabric (EF) network in a device independent manner. The target endpoint 8 runs the server application 2, and the driver application 3 interacts with the target endpoint's registers, e.g. RapidIO Registers 12, to enable the client application to access the EF network, e.g. RapidIO network 9. All of the device dependent code is contained within the driver application 3, which implements a low level interface with the specific EF controller on the target endpoint 8. Typically a processing element library 13 is provided in the client application, for reasons that will hereinafter be described.

In the event that the user wishes to use their own Driver, e.g. a RapidIO Driver, on the target endpoint 8, a Custom Driver Interface 14 can be used to interface the Server Application Programming Interface (API) and the users Driver API. Any number of server applications 2 can exist within a given EF network and connect with the client application 1 to perform network management and diagnostic functions from a different point within a network. Further, any number of server applications 2 can work collaboratively to provide the client application 1 a full view of a broken network map, which can not be fully observed from any one server application 2

Once the client application 1 is running on the remote workstation 4 and at least one target endpoint 8 has a server application 2 and a driver application 3 running thereon, a user operating the client application 1 activates the "discovery" and "enumeration" operations, which instructs the server application 2 to search out and enumerate each target endpoint in the EF network 9. Each time a new target endpoint is discovered the server application 2 will assign a unique destination identification number (ID#) thereto. The server application 2 selects each new destination ID# based on the previous destination ID# and a predetermined step size or on a client application prompted input from the user.

Figure 2:
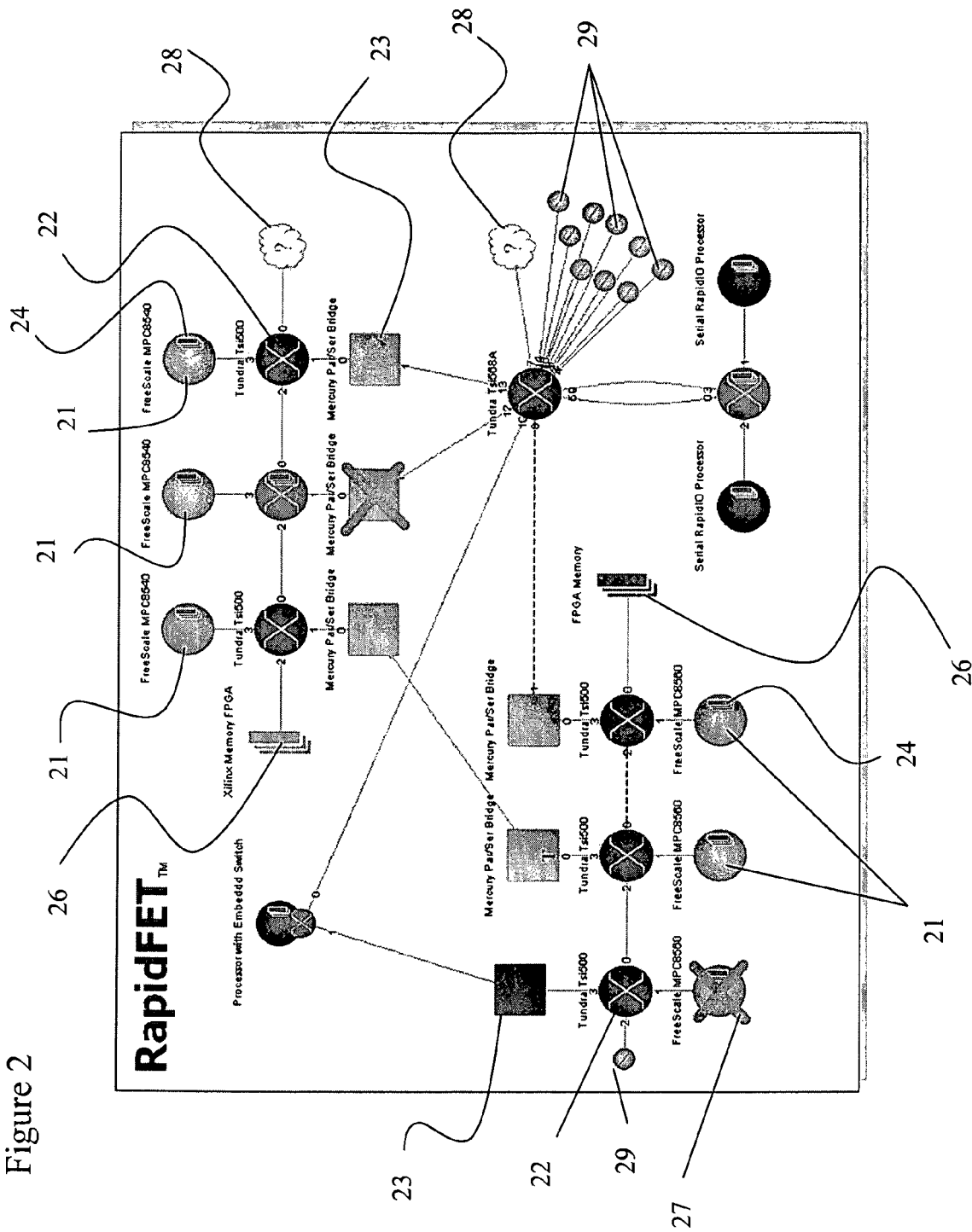
FIG. 2 illustrates a graphic display and interface of an exemplary RapidIO network produced by the present invention.

Systems with multiple paths between target endpoints are referred to as full mesh systems. Discovery and enumeration of such systems are quite complex as the processes involve circular loops in which the algorithm must be able to detect when it finds processing elements which have been previously discovered. The tool utilizes a method of electronically placing a finger print within each processing element, so that it can identify previously discovered processing elements and differentiate between discovery sessions. For example, in RapidIO based systems, this finger print is encoded within the component tag register, which is available within every processing element. Corresponding to each processing element's electronic finger print, a unique human readable Node Identification (Node ID) is assigned and displayed on the interactive network map for each processing element. Each switch is initialized with routing tables to ensure all processing elements are capable of communicating with each other With reference to FIG. 2, the network management and diagnostic tool is then able to construct an interactive graphical representation 20 of the network, i.e. network map, including all the processing elements therein and the possible data routes therebetween. In accordance with the present invention processing elements include processors, represented by circular icons 21; switches, represented by circular icons 22 with crossed paths and port numbers; and bridges, represented by square icons 23. Combinations of the primary processing elements, e.g. processor, switch, bridge and memory, can also be represented. For example, processing element icons 21, representing processing elements with memory, include a series of overlapping rectangles 24. Another example is a processor with an embedded switch therein is represented by a circular processor icon 25 (See FIG. 4) with an overlapping small switch icon. Separate memory elements are also represented by icons with a series of overlapping rectangles 26. Preferably, information relating to known processing elements are stored in the processing element library 13 (see FIG. 1), which is continually accessed during the map construction stage. Defective processing elements, which could be identified and/or were operating at one time, are represented by icons with large red crosses 27 therethrough. A health monitor function of the network management and diagnostic tool of the present invention will periodically access one or more registers in each processing element to determine if each processing element continues to function properly. When the one or more registers become unreadable, the large red cross 27 will be added to the network map 20. Selecting an icon with a red cross 27 therethrough initiates a display of a potential cause of the defect. Unknown devices, e.g. not responding to attempts at discovery or enumeration, are represented by an icon 28 with a question mark in a cloud (see FIGS. 3 and 4). Unconnected ports on switches are represented by small round "null" icons 29.

The processing element (PE) library 13 of EF devices, e.g. RapidIO devices, also defines any number of internal registers, unique proprietary implementations of functionality including performance monitoring, routing tables, error monitoring, data flow control, and device specific functions. Devices included in the PE library 13 enable the management and diagnostic tool according to the present invention to leverage capabilities of the device that are not part of the standard EF specification. Each PE library 13 is comprised of a certified library and a custom library. Certified libraries are produced by Fabric Embedded Tools® and often support more of the user defined functionality. Custom libraries can be created by users to define proprietary devices and custom designs. Typically, the custom libraries are created with XML scripts and follow a format and syntax document unique to Fabric Embedded Tools® products. Icons for known processing elements that exist within the PE library 13 are illustrated within the network map in color, e.g. blue and green, while icons that are not found in the PE library 13 are not known and illustrated in black and white.

Any PDF document or user manual that describes one of the element/devices within the graphical representation 20 can be attached to the ICON for the device, so that this reference material can be easily opened and reviewed through the interactive ICONs.

Figure 3:
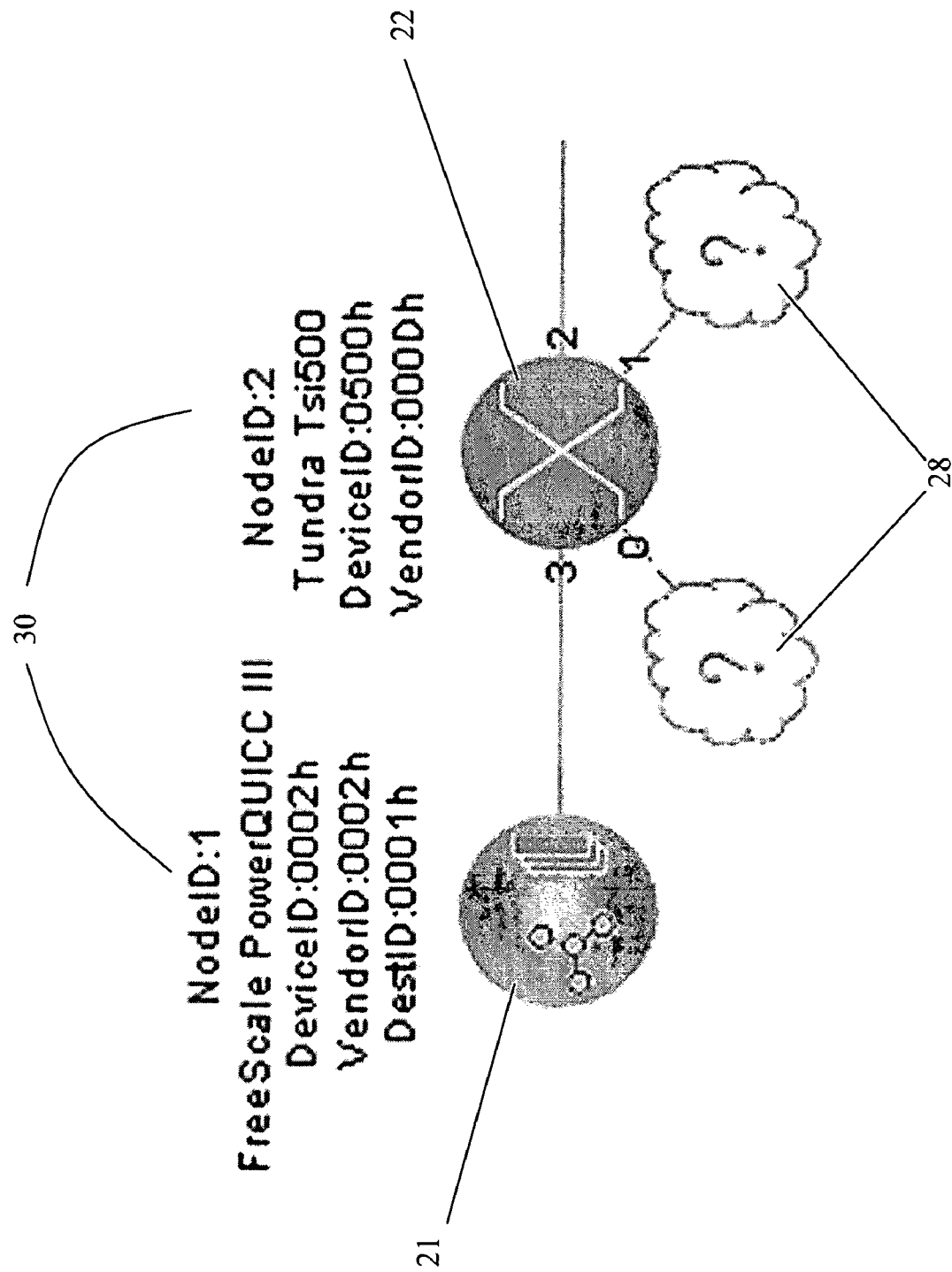
FIG. 3 illustrates examples of icons, corresponding to processing elements, from the graphic display of FIG. 2 with information annotations comprising information relating to one or more of the characteristics thereof.
Figure 4:
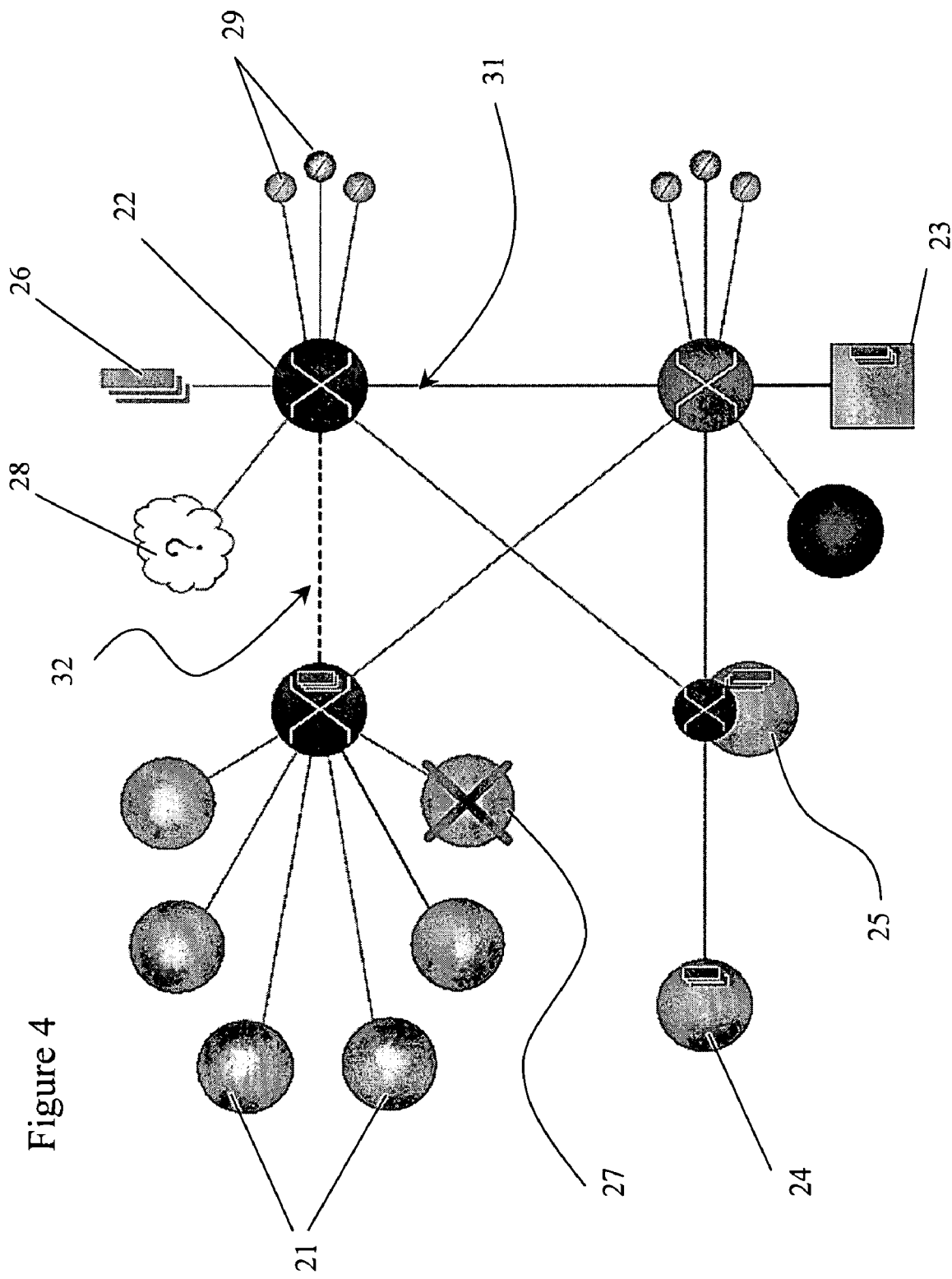
FIG. 4 illustrates a graphic display according to the present invention including problem processing elements and links.

FIG. 3 illustrates annotations 30, which are established for each processing element, and preferably include: the destination ID#, a node ID#, and other information obtained from the PE library 13 or entered by the user, i.e. common name, device ID number, vendor ID number, number of ports, manufacturer, fault status, and routing table status. The annotation 30 or any part thereof for each processing element can be displayed on the graphical representation 20 by selecting the appropriate processing element and selecting a display-properties tab or by selecting the properties you are interested in for all of the processing elements from a global display list.

Figures 5A, 5B:
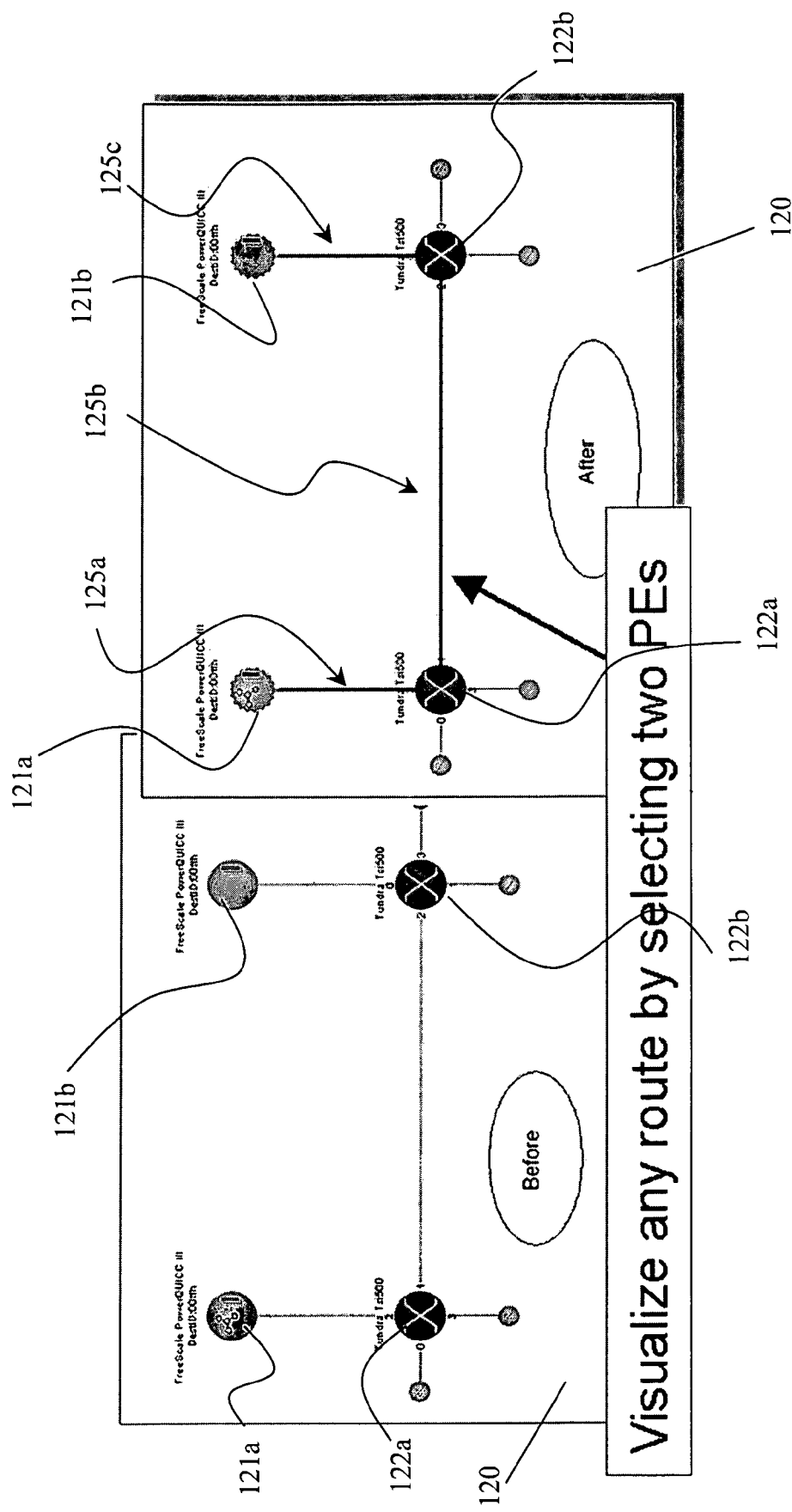
FIGS. 5a and 5b illustrate graphic displays according to the present invention before and after highlighting specific data paths, respectively.
Figure 6:
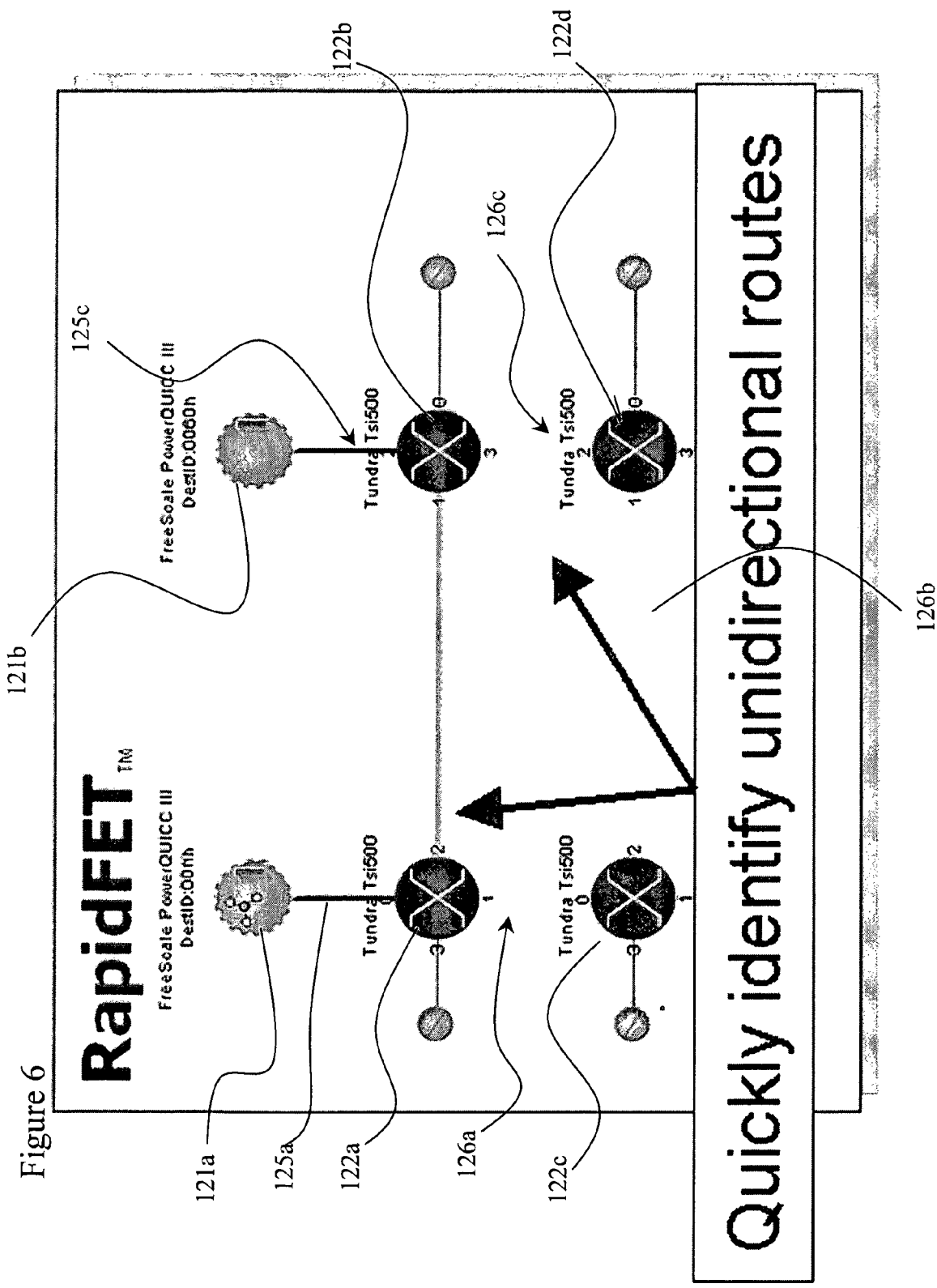
FIG. 6 illustrates a graphic display according to the present invention with unidirectional data paths highlighted.

With reference to FIGS. 4, 5a, 5b and 6, the data routes between processing elements are graphically illustrated in different formats, e.g. color, size or dash style, depending on the status thereof. For example: valid data routes will be illustrated in one format, e.g. green lines 31, while partially defective data routes will be illustrated in a different format, e.g. dashed red lines 32, and totally defective data routes in a different format, e.g. solid red line (see FIG. 2). Selecting the specific defective data route, e.g. by double clicking the designated red line, will result in a description of the problem to be displayed. The description of the problem is generated by the maintenance and diagnostic tool according to the present invention by reading the appropriate fault registers in the failed device(s) in question and interpreting the register value based upon a failure knowledge base. FIGS. 5a, 5b and 6 illustrate the process of visualizing a data path between any two processing elements, e.g. microprocessors 121a to 121b via switches 122a and 122b. A graphical representation 120 is illustrated in FIG. 5a, in which all of the data routes are displayed in their active format, e.g. green. By selecting the icons 121a and 121b representing the two processing elements, the data path therebetween is displayed in a different color depending on the specific direction, e.g. bi-directional, forward or reverse. A bi-direction path, illustrated in FIG. 5b, is represented by a different format, e.g. thick blue lines 125a, 125b and 125c. In FIG. 6, two additional switches, represented by icons 122c and 122d, are found in the network providing alternative data routes between the two microprocessors 121a and 121b. The forward data path is represented by a line with one format, e.g. yellow lines 126a, 126b and 126c, while the reverse path is represented by a line with a second format, e.g. orange line 127. Lines 125a and 125c, representing bi-directional paths, complete the forward and reverse data routes.

The data path between first and second processing elements, including the direction, can also be changed by first selecting the start path function, and then by selecting the icon representing the first processing element and each icon in the desired path in succession. Alternatively, the first and second processing elements can be selected, and a generate path function can be selected in accordance with desired criteria, e.g. shortest path, least traveled path, required bandwidth etc.

Figure 7:
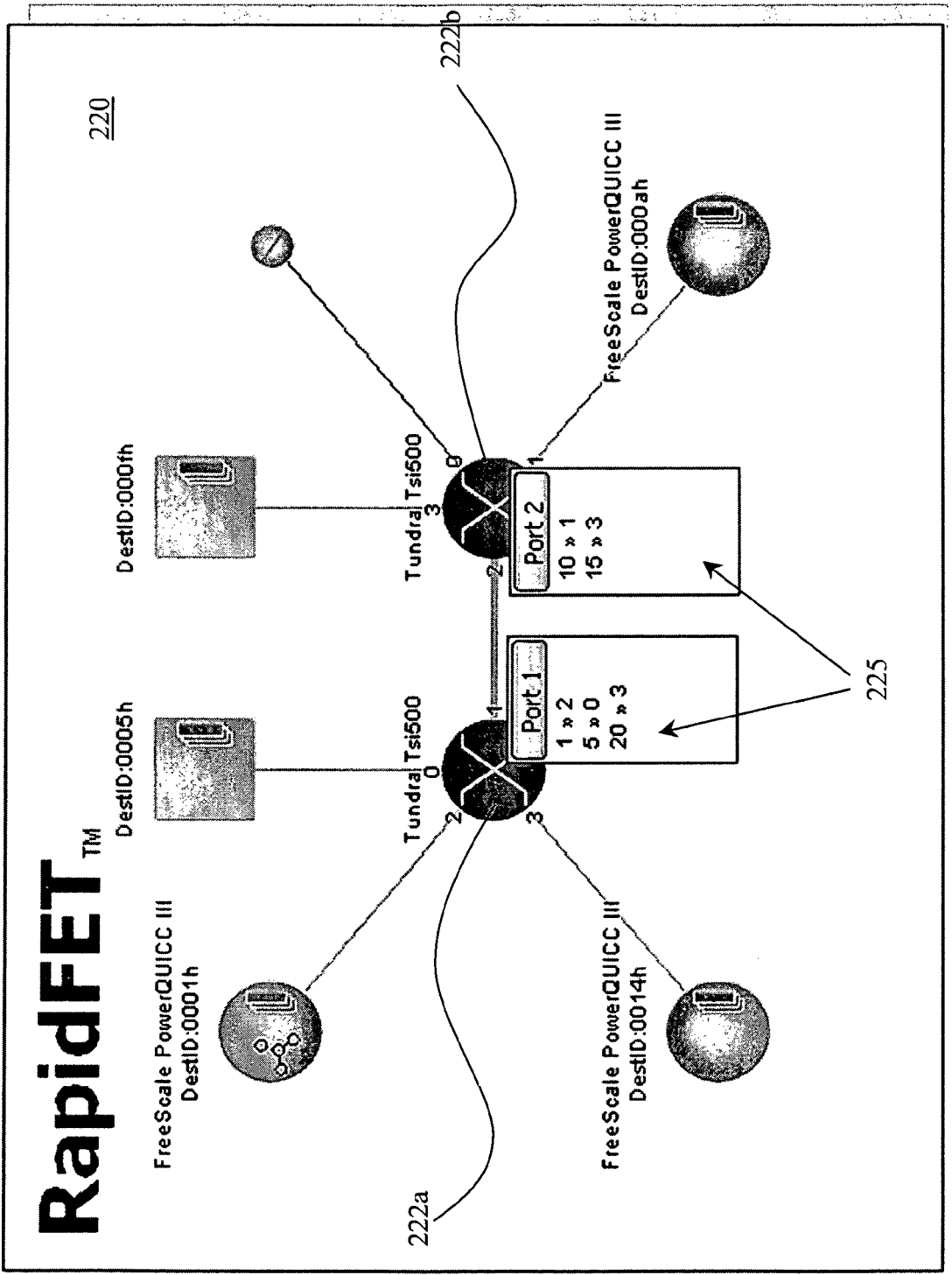
FIG. 7 illustrates a partial graphic display with routing tables provided for specific processing elements according to the present invention.

FIG. 7 illustrates a graphical representation 220 including icons 222a and 222b representing switches. Selecting any desired port on the display 220, and choosing a routing table view function will result in a routing table 225 being displayed. The routing table information is uploaded from the processing element, i.e. switch, in question.

Figure 8:
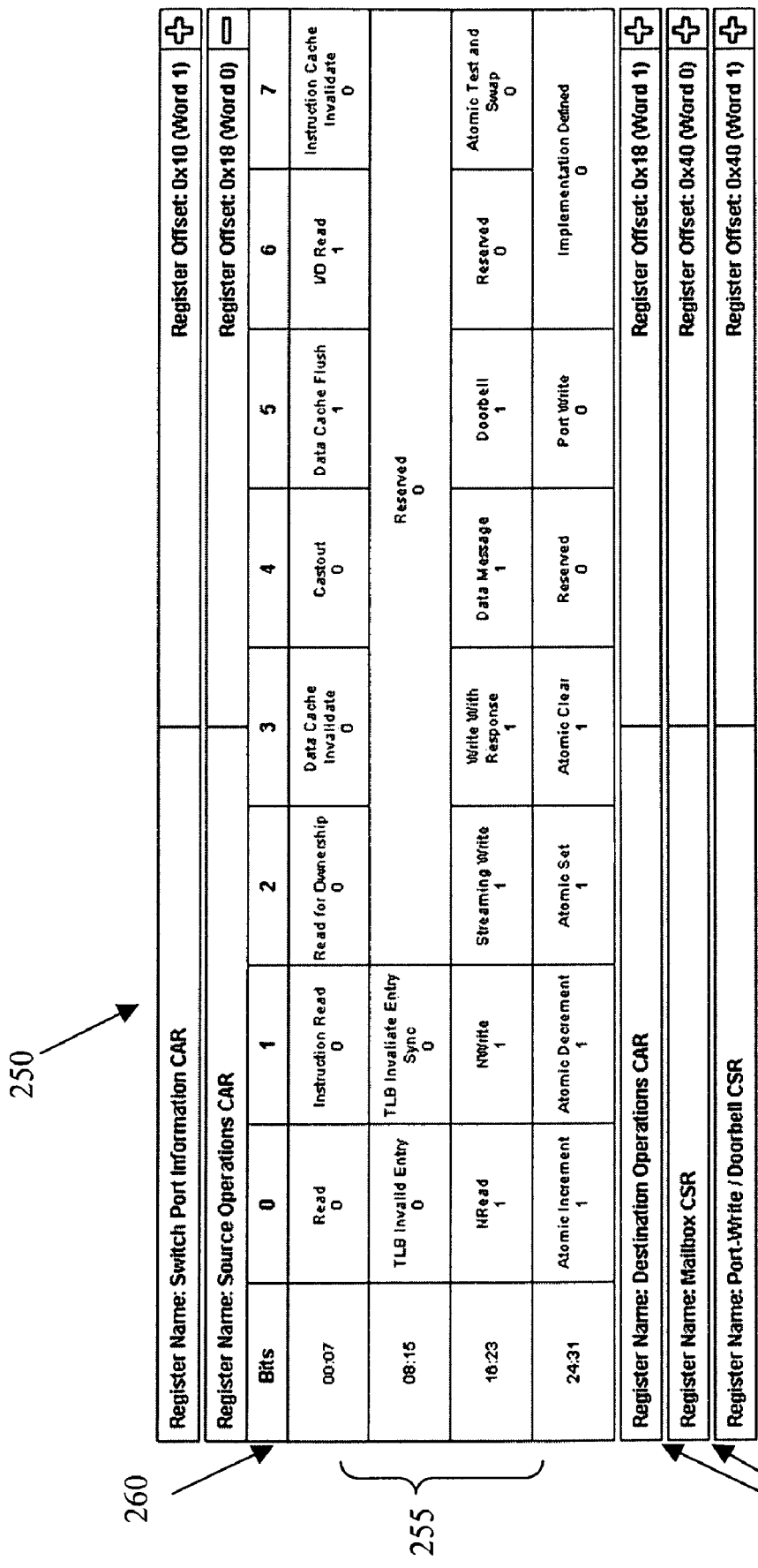
FIG. 8 illustrates an example of a memory map according to the present invention containing registers of interest for a processing element.

With reference to FIG. 8, by selecting to view one of the logical groups of registers within a device, a memory map 250 for the register block is displayed using human readable register names. Any individual register 255 can be expanded to show the value of the register along with a break down of the names and values of each of the bit fields 260 within the given register 255. The bit fields 260 are also graphically displayed in human readable form. The values of the registers are uploaded for the user from the desired processing element. The human readable register's names and bit fields a reloaded from the PE library 13 for the processing element in question. If the value of the register is edited by the user, the maintenance and diagnostic tool according to the present invention performs all of the commands, i.e. transparent to the user, needed to change the register value in the remotely located device within the network. The PE library 13 stores all of the device specific information therein to make it easy to automatically interpret the data for each unique device for the user.

Figure 9:
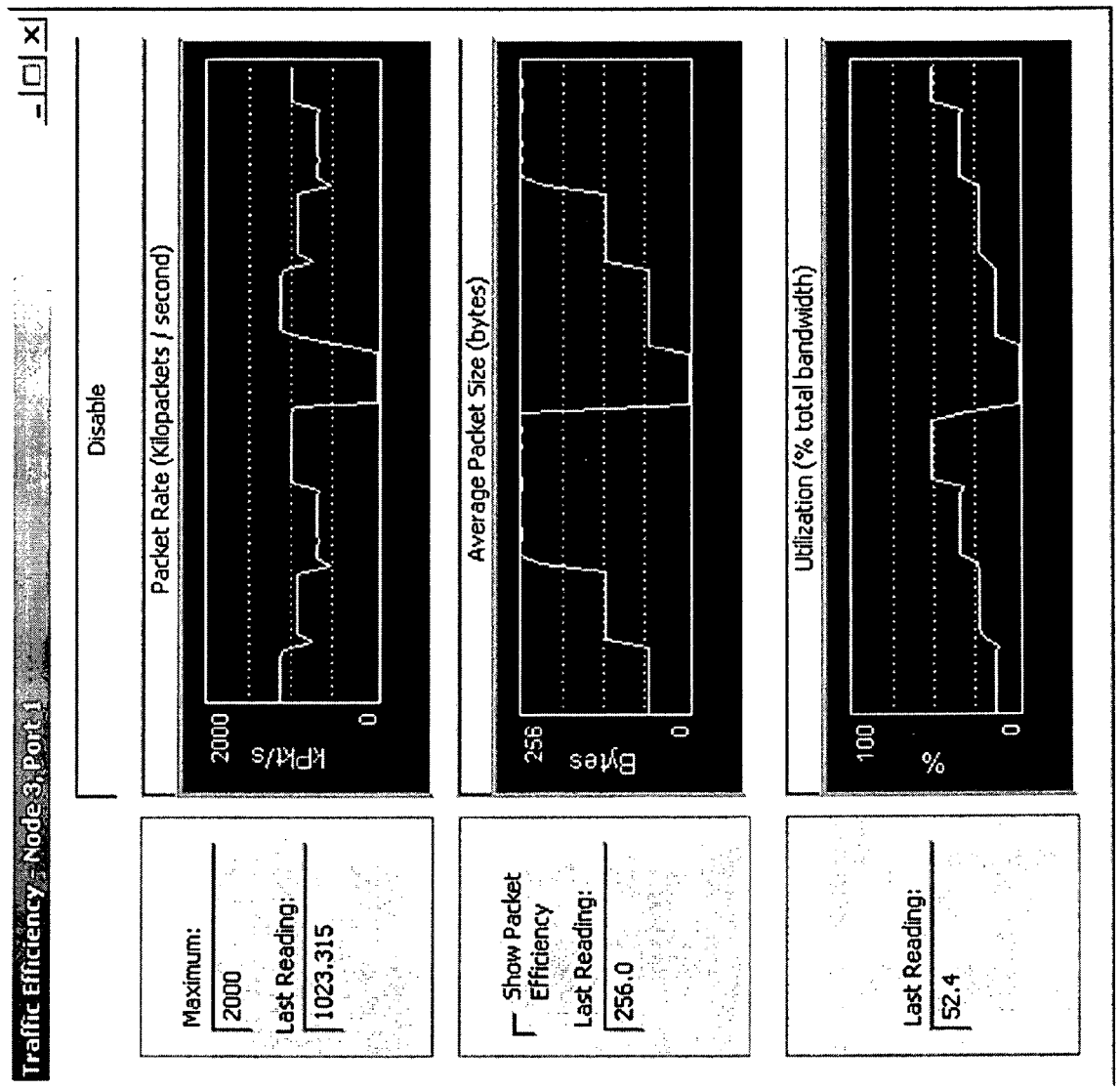
FIG. 9 illustrates a plot of traffic efficiency for a node/link from the graphic display of FIG. 1.

Many processing elements contain register(s) that collect raw performance data, which is of very little use or meaning to the user. However, data from one or more registers can be mathematically combined to represent meaningful information and displayed graphically by the maintenance and diagnostic tool according to the present invention. Most of these types of registers are unique to a processing element type (Processor, Memory, Bridge, and Switch) and manufacturer, therefore details of these registers are found in the custom or certified library or tool itself. An example of such a graphical display are visible in the plots of traffic efficiency illustrated in FIG. 9, which are displayed by selecting a desired node/link in the graphical representation (e.g. 20, 120 or 220) to observe the performance, e.g. packet rate, average packet size and utilization (% of total bandwidth), and to graphically visualize the performance in real time. Accordingly, performance can be monitored at one or more nodes within the system simultaneously.

Figure 10:
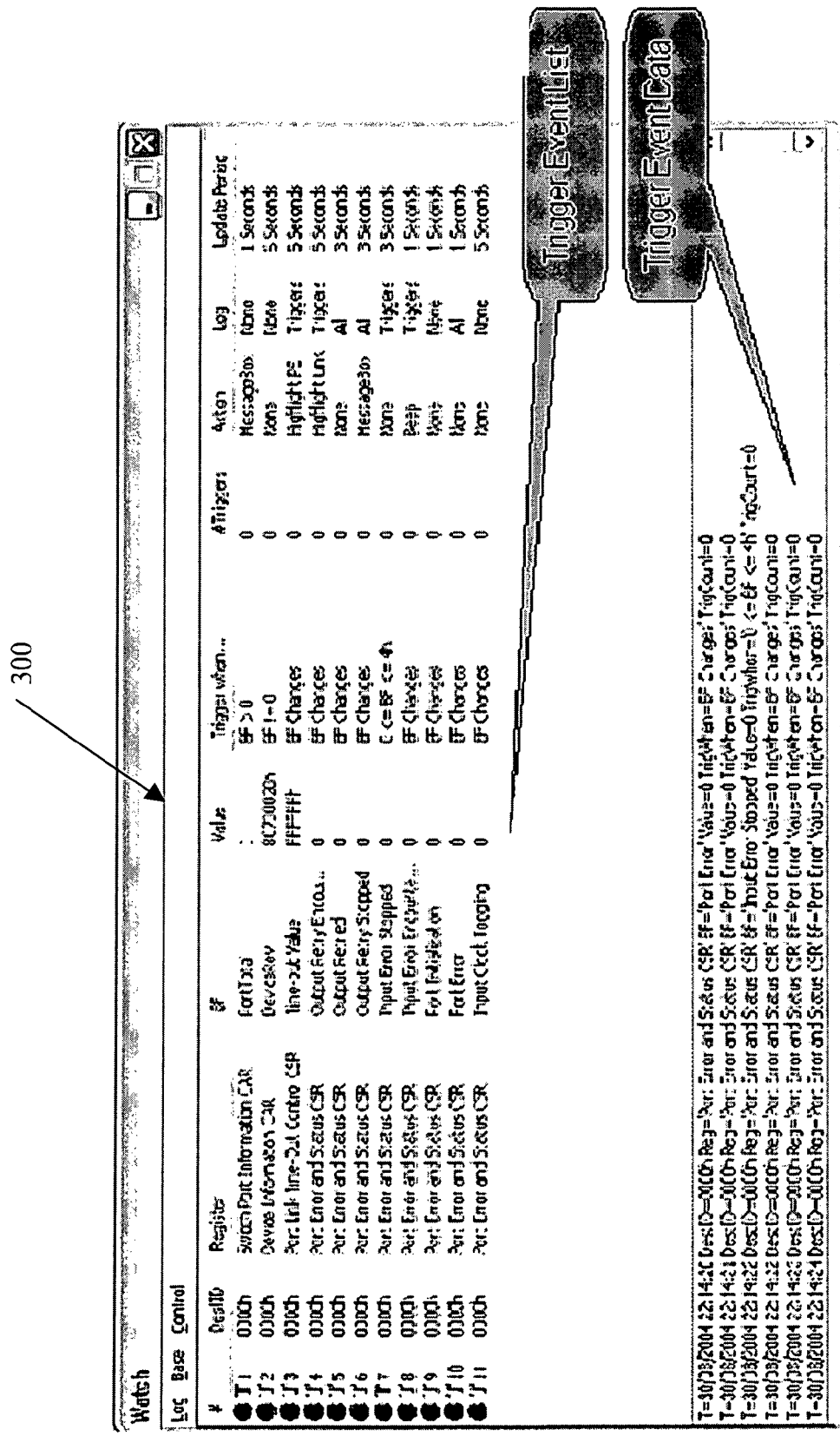
FIG. 10 illustrates a watch window for listing the specific registers being monitored in accordance with the present invention.

A watch window 300, see FIG. 10, provides a table of registers selected visually through the memory map to enable automatic monitoring. Registers can be monitored for any number of changes as defined by Boolean mathematical expressions within a Graphical User Interface dialog window. Any desired register can be monitored at a variety of desired time intervals by selecting the desired register and adding the desired register to the watch window, and configuring the watch window through the GUI interface. Once enabled, the maintenance and diagnostic tool according to the present invention will automatically issue the appropriate commands to read the register(s) and check them against the specified conditions. Moreover, if an error condition is detected, the maintenance and diagnostic tool will take the appropriate action(s), e.g. issuing audible and/or visual alarms within the network map.

Figure 11A:
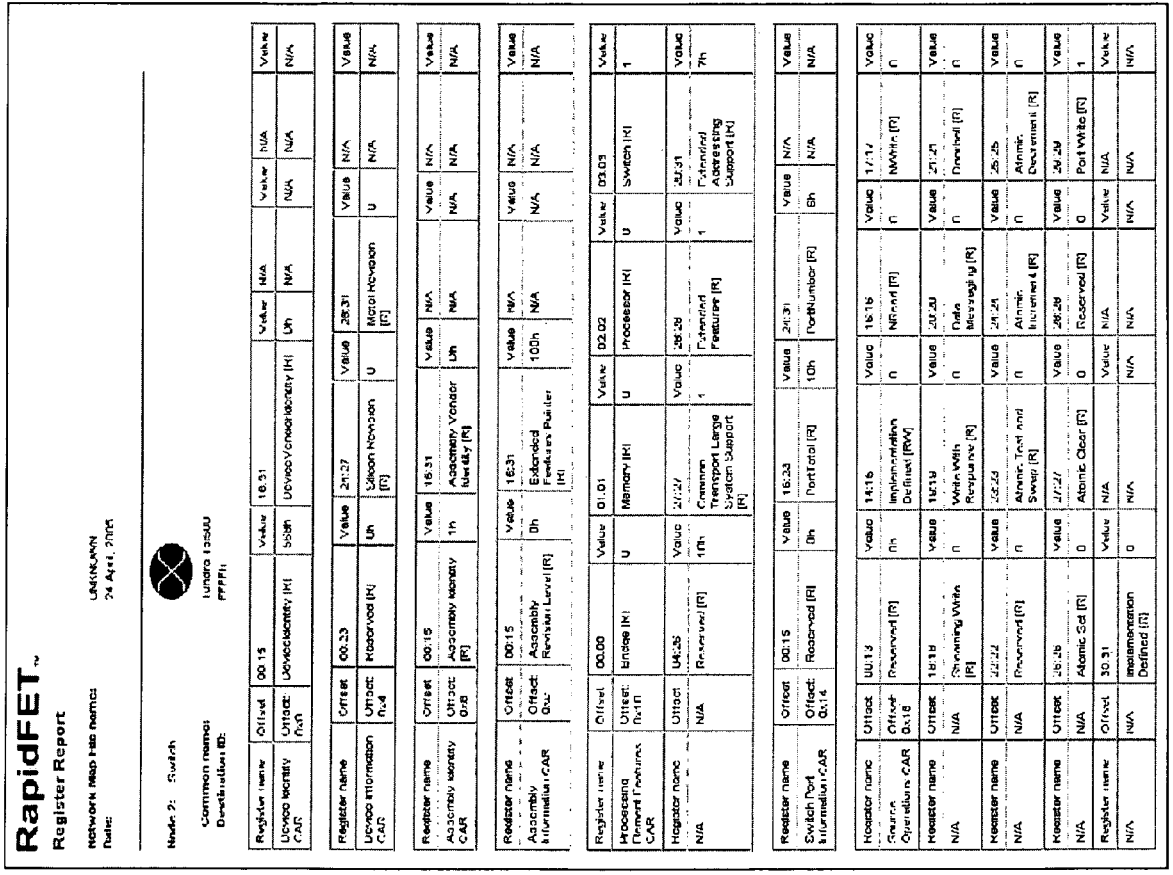
Figure 11B:
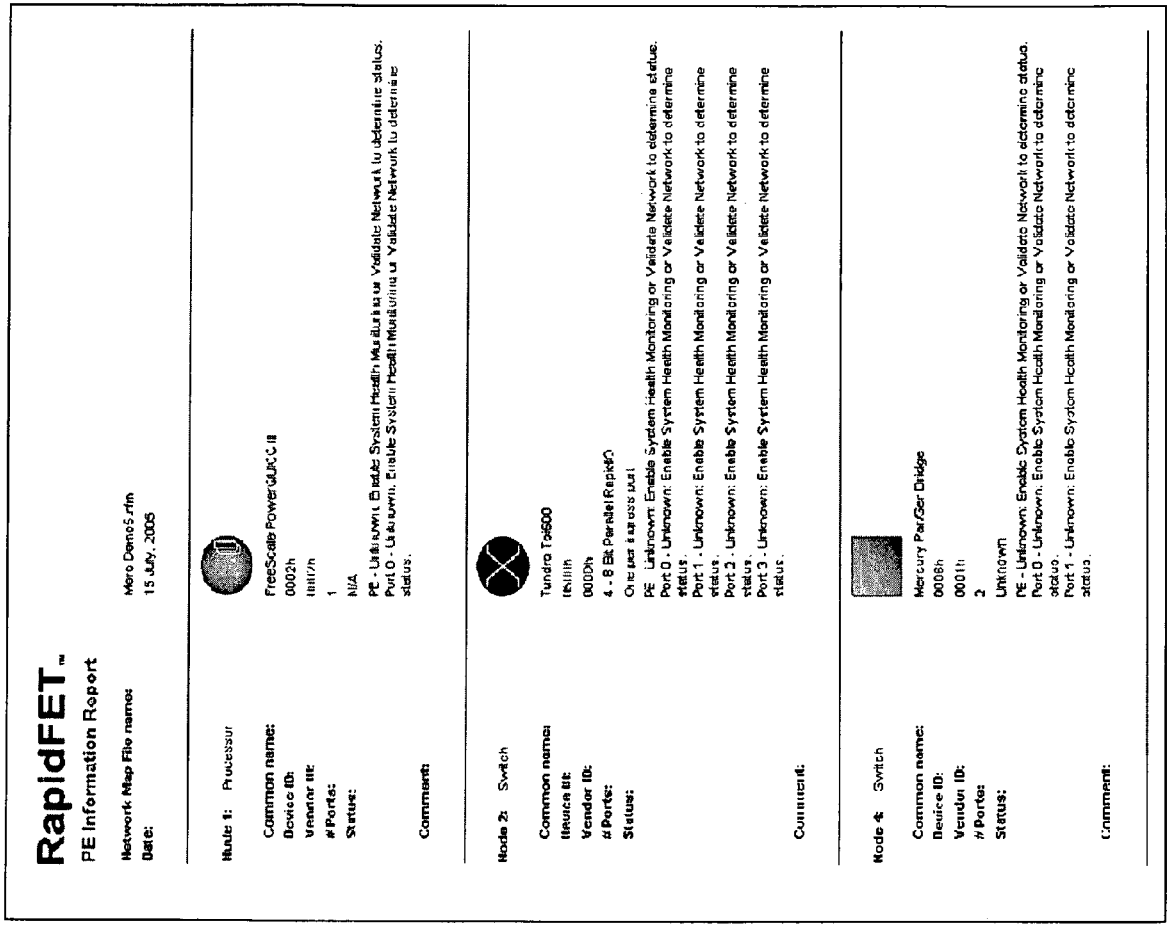
Figure 11E:
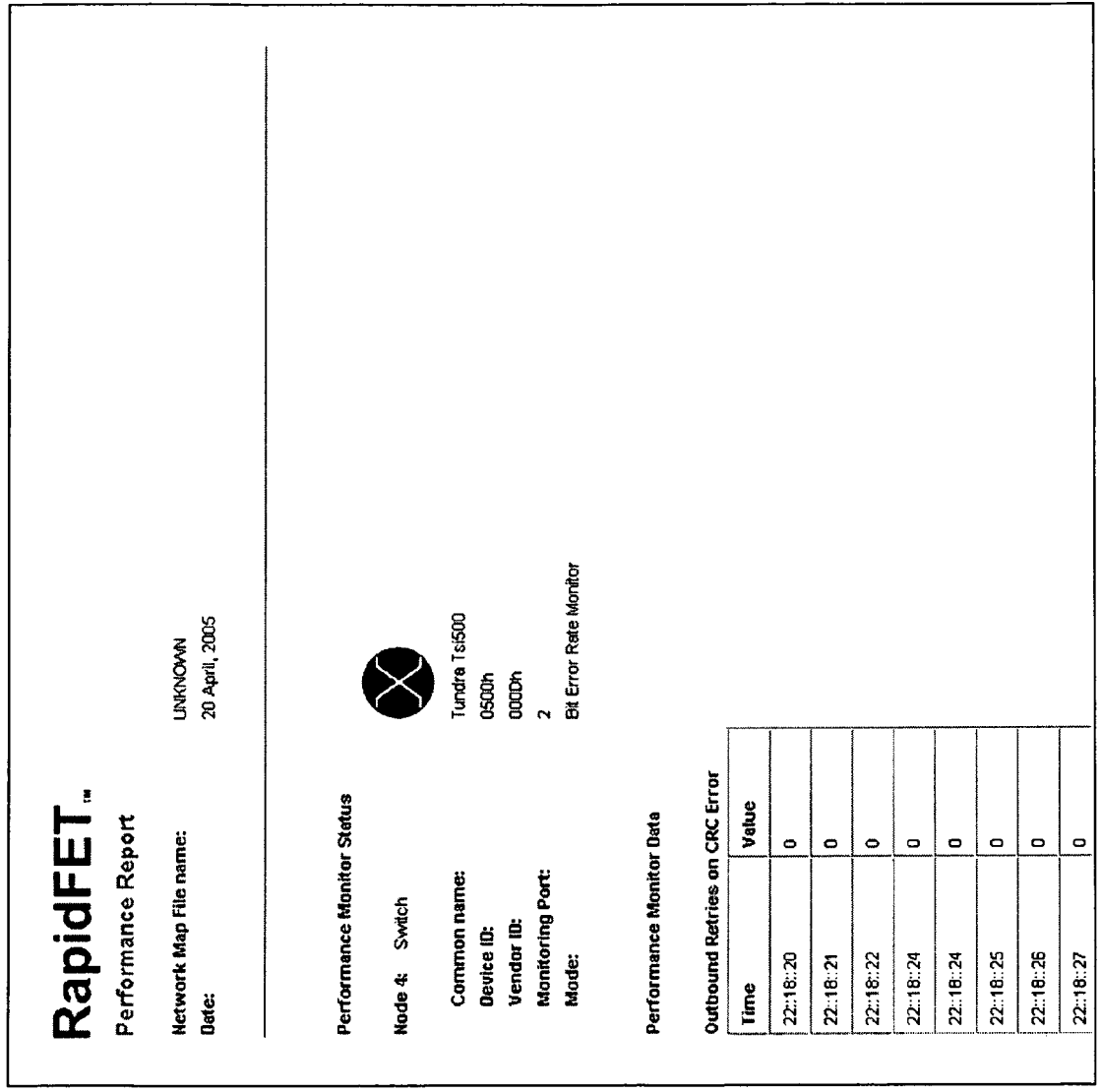

Report Generation, see FIG. 11a to 11e, provides a detailed report on system configuration and performance, such as processing element (FIG. 11b), register (FIG. 11a), routing table (FIG. 11c), watch window (FIG. 11d), and performance information (FIG. 11e). The maintenance and diagnostic tool captures the data from the registers within the system, collects the data over time, processes the data to extract information, combines this information with the information stored in the libraries for each component, and presents the combined information in human readable reports.

Full control of embedded tools are essential to ensure that automated data collection features, for example, do not interact with the network without the user being aware. Therefore, manual and automatic system health monitoring capability is preferably provided. System health can be validated periodically by pressing a Network Validation button or automatically at a regular interval by activating a Heart Beat Monitor function. Either approach requires the tool to systematically traverse the network to validate each processing element, e.g. by accessing one or more registers to ensure they can be accessed, and associated links to other processing elements. Should any errors be detected the network map is annotated appropriately as described hereinbefore.

Processing elements can be moved around the network map as required to facilitate a logical layout. A subset of processing elements can be selected as a group and moved while interconnections to the rest of the network stretch according to the groups movement. Links interconnecting processing elements can be changed to be represented by straight or curved lines to facilitate a logical visual appearance. User comments can also be annotated to any processing element and viewed along with the general processing element information.

We claim:

1. A method of creating an interactive network map for management of an embedded fabric based system including a plurality of processing elements, which include at lest one switch, comprising the steps of:
    a) discovering processing elements in the system and data routes therebetween;
    b) enumerating each processing element with a unique identification label;
    c) initializing each switch with routing tables to ensure all processing elements are in communication with each other;
    d) producing a graphical user interface including an interactive network map with corresponding icons for each processing element and the data routes therebetween utilizing information about the processing elements and data routes discovered in steps a), b), and c), whereby information about a specific processing element is displayed by activating the icon corresponding to the specific processing element; and wherein step b) includes electronically placing a fingerprint in each processing element, whereby a same processing element is identifiable via multiple data routes enabling a system with multiple data routes to multiple processing elements to be mapped accordingly.

2. The method according to claim 1, wherein the processing elements include one or more selected from the group consisting of switches, bridges, memory and processors.

3. The method according to claim 2, wherein step a) includes accessing a library of known processing elements for detailed information relating to similar discovered processing elements.

4. The method according to claim 3, wherein step d) includes displaying processing elements found in the library in a format different than processing elements not found in the library.

5. The method according to claim 1, wherein step a) includes:
    providing client software on a workstation connected to the system;
    providing a server for a first processing element for communication with the client software; and
    providing a driver for the first processing element for enabling communication between each server and the system.

6. The method according to claim 5, wherein step a) includes providing a server for a second processing element for communication with the client software; wherein for step d) the client software reconciles network views from the first and second servers, whereby networks with many broken links are displayable in one composite view.

7. The method according to claim 1, wherein step b) includes automatically assigning the identification label to each processing element.

8. The method according to claim 1, wherein step b) includes prompting an operator for the identification label.

9. The method according to claim 1, wherein step b) includes creating annotations for each processing element comprising information relating to one or more of the characteristics selected from the group consisting of device type, device identification number, vendor identification number, number of ports, manufacturer, fault status, fault diagnosis, routing table status, and node identification label.

10. The method according to claim 1, wherein step d) includes displaying disabled data routes in a format different than enabled data routes.

11. The method according to claim 1, wherein step d) includes displaying disabled processing elements in a format different than enabled processing elements.

12. The method according to claim 1, wherein the embedded fabric based system is a system selected from the group consisting of a RapidIO system, a PCI Express system, and an Advanced Switching Interconnect system.

13. The method according to claim 1, further comprising establishing a link with at least one architectural register from one of the processing elements via the corresponding icon.

14. The method according to claim 13, further comprising automatically reestablishing the link with the at least one architectural register at desired time intervals.

15. The method according to claim 14, further comprising determining whether the one processing element is functioning properly from the at least one architectural register; and providing a visual indication on the network map, when the one processing element fails to function properly.

16. The method according to claim 14, further comprising providing an alarm for providing an indication that the at least one register has an undesired value.

17. The method according to claim 14, further comprising producing a graph of network performance at various locations from information received from the at least one register.

18. The method according to claim 14, further comprising generating a report to support system design documentation or system diagnostics from information received from the at least one register.

19. The method according to claim 13, further comprising providing a user interface for editing the at least one register.

20. The method according to claim 1, wherein step d) includes providing an indication of forward and reverse routes between first and second processing elements, when the corresponding icons for the first and second processing elements are actuated; and wherein the forward route is indicated by a different format than the reverse route, when the forward and reverse routes are different.

21. The method according to claim 20, wherein a new forward or reverse route between the first and second processing elements is capable of being generated by actuating, in sequence, the icon corresponding to the first processing element, all of the icons corresponding to processing elements between the first and second processing elements, and the second processing element.

22. The method according to claim 20, wherein a new forward or reverse route between the first and second processing elements is capable of being generated by actuating the first and second processing elements and an automatic routing function, which is based on desired criteria.

23. The method according to claim 1, wherein step d) includes attaching a PDF document to at least one processing element icon, whereby reference manual information is conveniently accessible.

24. The method according to claim 1, further comprising establishing a link with a desired switch in the network to determine routing table information; wherein routing tables for the desired switch are displayable by activating an icon corresponding to the switch.

25. The method according to claim 1, wherein icons corresponding to at least one processing element are moveable on the network map, whereby the data routes to other processing elements move accordingly.

26. The method according to claim 1, wherein the processing elements includes at least one switch, at least one bridge, at least one memory and at least one processor.

* * * * *